United States Patent [19]

Portinari

[11] Patent Number: 4,620,412
[45] Date of Patent: Nov. 4, 1986

[54] PROCESS AND APPARATUS FOR INSERTING OPTICAL FIBERS IN HELICAL GROOVES OF A CABLE CORE

[75] Inventor: Antonio Portinari, Sesto San Giovanni, Italy

[73] Assignee: Societa Cavi Pirelli S.p.A., Milan, Italy

[21] Appl. No.: 808,335

[22] Filed: Dec. 12, 1985

[30] Foreign Application Priority Data

Dec. 17, 1984 [IT] Italy ............................. 24091 A/84

[51] Int. Cl.⁴ .................... D07B 5/00; D01H 13/04
[52] U.S. Cl. ........................................ 57/6; 57/352
[58] Field of Search ................ 57/3, 6, 9, 11, 13, 57/17, 18, 264, 293, 311, 352, 361

[56] References Cited

U.S. PATENT DOCUMENTS

| | | | |
|---|---|---|---|
| 4,237,687 | 12/1980 | Vecchis et al. | 57/352 X |
| 4,248,035 | 2/1981 | Skillen et al. | 57/6 |
| 4,309,864 | 1/1982 | Hulin | 57/6 |
| 4,388,799 | 1/1983 | Vives | 57/6 |
| 4,411,130 | 10/1983 | Dubois et al. | 57/352 |

Primary Examiner—Donald Watkins
Attorney, Agent, or Firm—Brooks Haidt Haffner & Delahunty

[57] ABSTRACT

A process and apparatus for laying optical fibers in the helical grooves of a core for an optical fiber telecommunication cable in which the rotatable bobbins carrying the optical fibers are held in axially fixed positions while the core with helical grooves and the fibers are fed to and through a rotatable fiber inserting device which has projections extending into the grooves which cause rotation of the device as the core is advanced. Between the bobbins and the fiber inserting device there is a supporting tube through which the core passes and the outer surface of which engages and supports the fibers. The downstream end of the tube terminates in advance of the fiber inserting device so that the fibers may enter the grooves in the core at the fiber inserting device.

12 Claims, 3 Drawing Figures

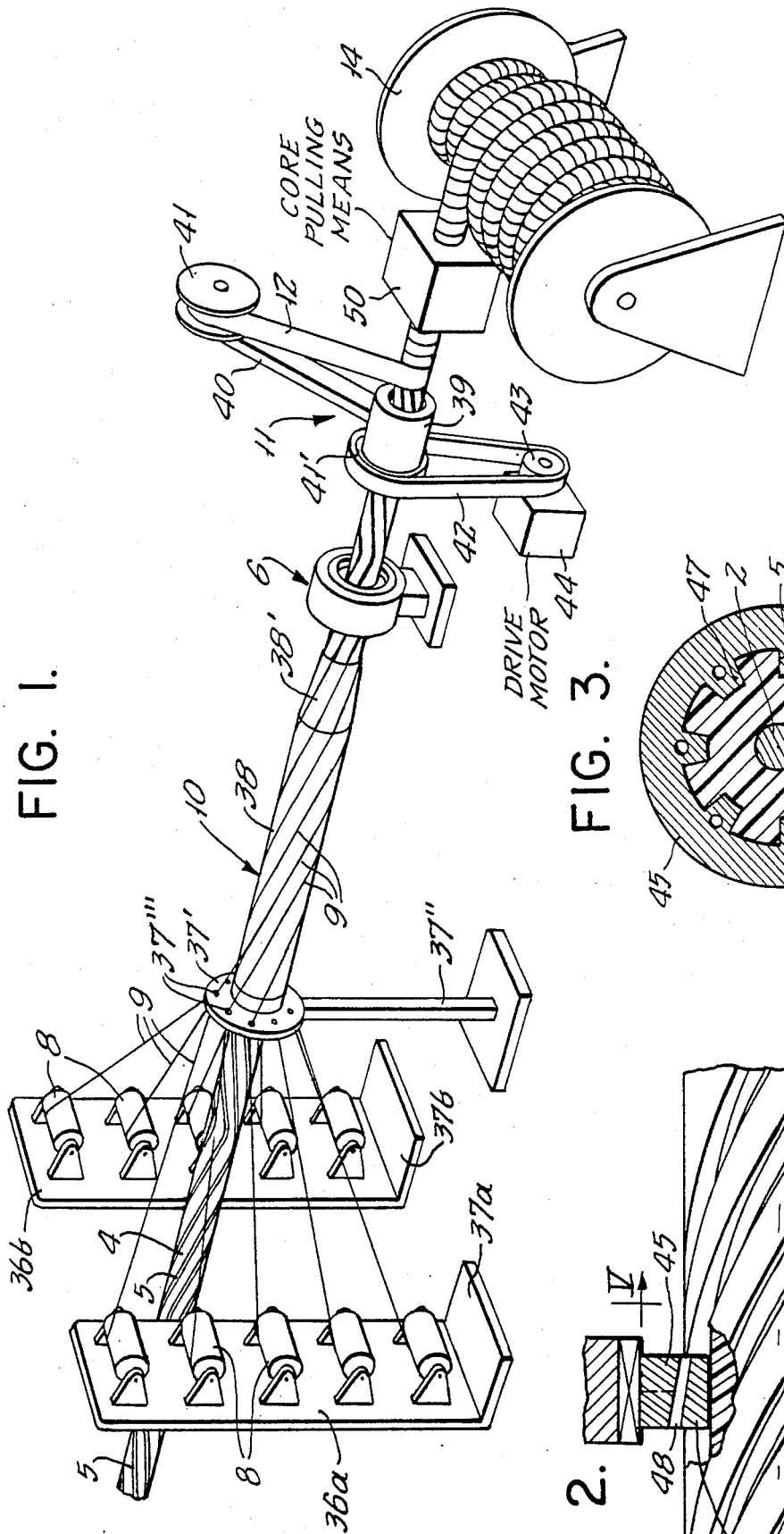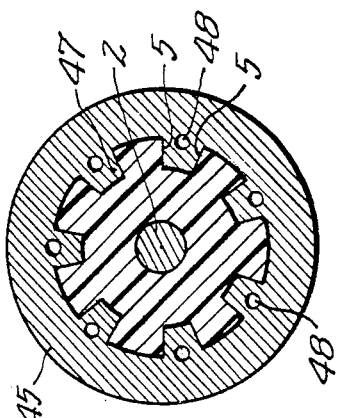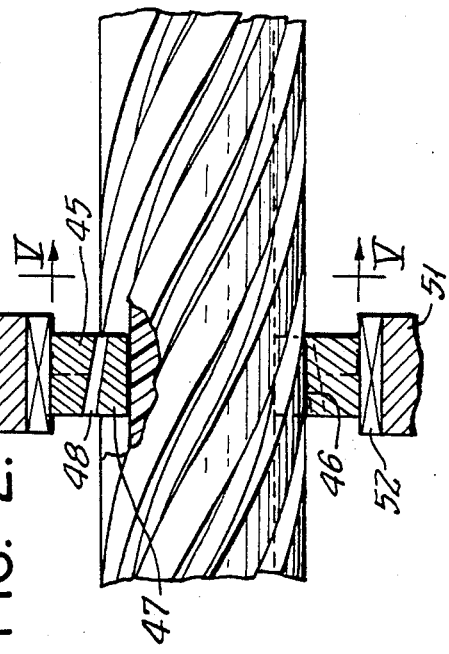

PROCESS AND APPARATUS FOR INSERTING OPTICAL FIBERS IN HELICAL GROOVES OF A CABLE CORE

The present invention relates to a process and to an improved production line for manufacturing elementary cables containing optical fibers or components of telecommunication optical fiber cables.

More particularly, the present invention relates to a process, and to a production line by means of which the process is effectuated, for making elementary cables containing optical fibers, such cables being of the type which include reinforced, generally cylindrical, plastic cores, on the surface of which there are open helical grooves for receiving optical fibers.

In this text, by the term "open helical grooves" is meant grooves whose configuration is comprised by S and Z lengths which are disposed in series, one with respect to the other. In other words, there is a length, e.g. a few turns, of a helical groove of right hand which is followed by a coextensive groove of a similar number of turns of left hand.

Elementary cables, or components for telecommunication optical fiber cables of the type in question, are already known.

Said known elementary cables comprise a generally cylindrical, plastic core, reinforced with a traction and compression resistant element. On the core surface there is a plurality of open helical grooves inside which optical fibers are loosely received. Moreover, around the core there is present a covering comprised of either a lapping of tapes or an extruded sheath, which, in covering the grooves also protects the optical fibers received therein.

Processes and production lines for the manufacture of the optical fiber elementary cables are known, and in such processes, for inserting optical fibers into the core grooves, there is employed a cylindrical body, provided with a through-cavity, through which the grooved core passes and by means of perforated appendages, extending from the inner cavity of said cylindrical body, the optical fibers, drawn from the storing bobbins, are layed into the grooves.

In the known production lines, the bobbins, which carry the optical fibers, are disposed around the body which provides for the inserting of the optical fibers into the grooves. The execution of this operation, with the known methods and production lines, takes place according to the two types of apparatus described hereinafter.

According to the first of these two types of apparatus, the bobbins which store the optical fibers and which are disposed around the core are supported on a disc which rotates at the same rotational speed as that of the body inside which the grooved core passes and through the means of which the laying of the optical fibers into the grooves take place.

According to this type of apparatus, for preventing damage to the optical fibers resulting from possible speed variations between the rotating body (used for inserting the optical fibers) and the also rotating disc (upon which the bobbins storing the optical fibers are supported), means are provided for synchronizing the rotation speeds.

According to another known type of apparatus for inserting the optical fibers into the core grooves, the bobbins holding the optical fibers are disposed in a fixed position around the core that passes into the body through-cavity which carries out the inserting of the optical fibers into the grooves, and the core is subjected to a rotary movement about its own axis. For obtaining this rotary motion of the core, both the bobbin from which the core unwinds, and the bobbin collecting the core, which contains the optical fibers in the grooves, are rotated.

For both of these hereinbefore-described systems, devices are required for synchronizing the rotation speeds which are quite sensitive and difficult to adjust.

One object of the present invention is to overcome the described drawbacks in the known processes and production lines for manufacturing optical fiber elementary cables having grooved cores while also rendering said production lines more compact.

The principal object of the present invention is a process for manufacturing optical fiber elementary cables of the type comprising a cylindrical plastic core, reinforced by at least one longitudinal, traction and compression resistant element, the surface of said core having at least one open helical groove for receiving at least one optical fiber, said process comprising the step of advancing, without rotation and preferably, along a rectilineal path, a cylindrical core provided with at least one open helical groove at its surface, through the cylindrical cavity of a rigid body coaxial to it and provided with appendages engaging the core groove, into which at least one optical fiber is layed, so as to provide a male-female screw coupling. The process is characterized by the fact of comprising the step of feeding the fibers from surrounding, fixed position bobbins to the cylindrical core which advances without rotation, the rigid body having means for providing a support for the optical fibers prior to the insertion of them into the core grooves through the appendages on said rigid body.

Another object of the present invention, is a production line for manufacturing optical fiber elementary cables of the type comprising a cylindrical plastic core reinforced by at least one longitudinal, traction and compression resistant element, the surface of said core bearing at least one open helical groove for receiving at least one optical fiber, said production line comprising:

(1) a rigid body provided with a cylindrical cavity through which the said cylindrical core can pass;

(2) means extending from the cylindrical cavity of the rigid body and engaging the grooves of the cylindrical core so as to provide a male-female screw coupling, said means being provided with through-holes for allowing the passage of optical fibers;

(3) a plurality of bobbins storing the optical fibers disposed in a fixed position around the core;

(4) means for advancing the core, preferably along a rectilinear path, while an alternating rotary motion is imparted to the rigid body, the said means of which is engaged with the grooves of the cylindrical core; and (5) a fixed tubular element, inside the bore of which the cylindrical core passes, interposed between the plurality of storing bobbins for the optical fibers and the rigid body having the means engaged with the grooves, said tubular element constituting a support for the optical fibers for at least part of passage between the bobbins and the rigid body.

In particular, the length of said fixed tubular element, in the production line of the invention, is not less than twice the half-pitch of the open helicoidal grooves of the core.

Other objects and advantages of the present invention will be apparent from the following detailed description of the presently preferred embodiments thereof, which description should be considered in conjunction with the accompanying drawings in which:

FIG. 1 is a diagrammatic perspective view of the apparatus of the invention, by which the laying of the optical fibers into the open helical grooves of the core is carried out.

FIG. 2 is a fragmentary, enlarged, longitudinal cross-section of the device for inserting the optical fibers into the open helical grooves of the core forming part of the apparatus shown in FIG. 1; and FIG. 3 is a cross-section, taken along the lines V—V of the device shown in FIG. 2.

The basic step of the process according to the present invention, is to support, on a support fixed in position relative to the core, the optical fibers as they pass from the storing bobbins to the means for inserting them into the open helical grooves of the core.

One specific embodiment of apparatus for a process according to the present invention will be described hereinafter.

In the apparatus of the invention, provision is made for supporting the optical fibers, as they are drawn from storing bobbins which are disposed in a fixed position around the core which, preferably, advances with a rectilineal motion, during the passage of said optical fibers from the bobbins to the body which lays them into the open helical core grooves.

The optical fibers are inserted into the grooves by per se known means, and provision is made for collecting the so-formed core with the fibers in the grooves.

In FIG. 1, there is shown a production line for inserting the optical fibers 9 in the open helical grooves 5 of a core 4, said optical fibers 9 being drawn from the storing bobbins 8.

As can be seen in FIG. 1, a plurality of bobbins 8, carrying the optical fibers 9, is mounted on supports constituted by frames 36a and 36b which have bases 37a and 37b. Downstream of the frames 36a and 36b, an optical fiber supporting element 10 is disposed, the structure of which is described hereinafter.

Downstream of frames 36a and 36b and located at the production line axis, there is a circular plate 37' which is disposed for positioning the optical fibers and which is secured to a base 37''. The plate 37' has through-holes 37''' disposed on a circle coaxial to the axis of the production line.

A tubular body 38 extends from the plate 37', coaxial to the latter, and is secured to the plate 37' and hence, is fixed with respect to the ground.

The tubular body 38 has a surface having a low friction coefficient. Moreover, its end 38', which is farthest away from the plate 37', is tapered. Preferably, the tubular body 38 has a length which is not less than twice the half-pitch of the open helicoidal grooves 5 at the surface of core 4 and into which the optical fibers 9 have to be inserted.

In an alternative embodiment, the connection between tubular-body 38 and plate 37' is made by means of the interposition of rotation permitting elemehfs, for example, ball bearings which permit said tubular body 38 to rotate freely about its own axis.

The core 4, provided with open helical grooves, passes through the bore or through-cavity of the tubular body 38 and into the fiber inserting means 6 by which the insertion of the optical fibers 9 into the grooves 5 of the grooved core 4 is accomplished.

The optical fiber inserting means 6 (shown in detail in FIGS. 2 and 3) is of a per se known type and comprises a rigid body 45 provided with a through-cavity 46 having a plurality of inwardly extending projections or appendages 47 which extend into the grooves 5 of the core 4 as shown in FIG. 3. Moreover, the rigid body 45 has a plurality of perforations 48 of a size which allow the passage of the optical fibers. The rigid body 45 is rotatably supported from the stand 51 by a bearing 52.

Downstream of the fiber inserting means 6, a tape lapping machine 11 is provided for disposing a lapping of tapes 12 around the core 4, the grooves 5 of which have the optical fibers 9 inserted therein.

In FIG. 1, the lapping machine 11 comprises a hollow rotatable body 39, coaxial to the core 4 which passes through it. The body 39 has at least one arm 40 which carries a bobbin 41 of the tape 12.

Moreover, the body 39 is rotated by motor drive means which comprises a pulley 41' connected by a belt 42 and a pulley 43 rotatable by the drive motor 44 in such a way as to allow the tape bobbin 41 to rotate about the core 4 for lapping it with the tape 12.

Downstream of the lapping machine 11, there is a conventional pulling device 50 and a collecting bobbin 14 rotatable by a motor drive means of the per se known type (not shown).

The functioning of the previously described production line will be described hereinafter.

The grooved core 4, which can be formed immediately upstream of the described production line, or else, can be drawn from a storage bobbin, passes between the frames 36a and 36b into and through the tubular support 10, and then into and through the fiber inserting means 6 at which the optical fibers 9 are inserted into the grooves 5 of the grooved core 4.

Simultaneously, the optical fibers, carried by the bobbins 8, are advanced to the means 6 resting, or more precisely, winding and unwinding on the outer surface of the tubular body 38.

The body 45 of the fiber inserting means 6, in laying down the optical fibers 9 into the grooves 5 of the grooved core, is subjected to alternating rotations due to the male-female screw coupling obtained with the insertion of its projections 47 into the grooves 5, the core 4 being non-rotatable.

Since the bobbins 8 carrying the optical fibers 9 are disposed in fixed positions around the core 4 and since the rigid body 45, by which the optical fibers 9 are inserted into the grooves 5, is subjected to an alternating rotary motion, the optical fibers 9, during their passage from the bobbins 8 to the rigid body 45, wind and unwind continually on the surface of the tubular body 38 which, due to its presence, protects them from undergoing dangerous stresses.

On leaving the fiber inserting means 6, the core 4, having the optical fibers 9 in its grooves 5 is provided with a covering which, in the embodiment illustrated, comprises windings of tapes 12.

In an alternative embodiment, the covering, instead of a winding of tapes 12, could be constituted by an extruded layer of plastic extruded over the core 4, with the fibers 9 in the grooves 5, in a conventional manner.

The elementary optical fiber cable thus obtained, is finally collected on the bobbin 14.

In the embodiment described, the production line, according to the present invention, is shown as a production line which is physically separated from the zone where the core provided with open helical grooves, is formed. However, it will be apparent to those skilled in the art that the production line for manufacturing elementary optical fiber cables may be integrated with a continuous production line in which an elementary optical fiber cable is formed, without discontinuity, at the same time that the grooved core is formed.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Process for manufacturing an optical fiber cable comprising a plastic core with a helical groove or grooves at its surface in which at least one optical fiber is disposed, said process comprising:

advancing said core with said groove or grooves on its surface to and through an optical fiber inserting device at which at least one optical fiber is inserted in said groove or grooves, said fiber inserting device being rotatably mounted and extending around said core and said fiber inserting device having at least one projection thereon which extends into one of said grooves;

upstream of said fiber inserting device, passing said core through a tube; and feeding at least one optical fiber, from a rotatable bobbin mounted in a fixed position upstream of said tube, adjacent the outer surface of said tube to said fiber inserting device.

2. A process as set forth in claim 1 wherein said core has a plurality of helical grooves in a circumferentially spaced relation to its surfaces, each groove being alternately of right hand and left hand, wherein at least one optical fiber is inserted in each groove, wherein said fiber inserting device has a plurality of projections thereon, one for each groove and wherein each optical fiber is fed from a bobbin mounted in a fixed position.

3. A process as set forth in claim 2 further comprising incorporating a longitudinally extending, traction and compression resistant element in said core upstream of said tube.

4. A process as set forth in claim 1 wherein said core is advanced to and through said optical fiber inserting device without rotation of said core around its longitudinal axis.

5. A process as set forth in claim 1 wherein said core is advanced to and through said optical fiber inserting device along a rectilinear path.

6. A process as set forth in claim 1 further comprising applying a protective layer around said core with at least one optical fiber in said groove or grooves downstream of said optical fiber inserting device.

7. Apparatus for manufacturing an optical fiber cable comprising a plastic core with a helical groove or grooves at its surface in which at least one optical fiber is disposed, said apparatus comprising:

a rotatable, optical fiber inserting device having an opening therein for the passage of said core therethrough and for inserting optical fibers in said groove or grooves, said device having means thereon receivable in said groove or grooves for causing rotation of said device with longitudinal advance of said core;

a tube mounted adjacent said device with its bore aligned with said opening in said device for the passage of said core through said tube to said device;

a plurality of rotatable bobbins mounted at the side of said tube remote from said device for carrying and supplying optical fibers to said device along paths adjacent to the outer surface of said tube, said bobbins being mounted with their axis of rotation in fixed positions spaced from each other; and means for advancing said core.

8. Apparatus as set forth in claim 7 wherein the length of said tube is at least equal to twice the half pitch of said helical groove or grooves.

9. Apparatus as set forth in claim 7 wherein said tube has a plate secured to the upstream end thereof, said plate having a diameter greater than the outer diameter of said tube and having openings therein in the portion thereof outwardly of said tube for the passage of optical fibers therethrough.

10. Apparatus as set forth in claim 7 wherein said tube is mounted for rotation around its longitudinal axis.

11. Apparatus as set forth in claim 7 wherein said advancing means advances said core without rotation of the core around its longitudinal axis.

12. Apparatus as set forth in claim 7 further comprising means downstream of said fiber inserting device for applying a protective layer around said core after it passes through said device.

* * * * *